H. DIRCKS.
Car Wheel.

No. 2,147.

2 Sheets—Sheet 1.

Patented June 26, 1841.

Witnesses
G. E. Lewis
U.S. Consulate
John Davis
Patent Office
Manchester

Inventor
Henry Dircks

H. DIRCKS.
Car Wheel.

No. 2,147.

2 Sheets—Sheet 2.

Patented June 26, 1841.

Witnesses.
G. E. Lewis
U. S. Consulate
John Davis
Patent Office
Manchester

Inventor
Henry Dircks

UNITED STATES PATENT OFFICE.

HENRY DIRCKS, OF LIVERPOOL, ENGLAND.

CONSTRUCTION OF WHEELS TO BE USED UPON RAIL OR OTHER ROADS OR WAYS.

Specification of Letters Patent No. 2,147, dated June 26, 1841.

*To all whom it may concern:*

Be it known that I, HENRY DIRCKS, of Liverpool, in the county of Lancaster and Kingdom of England, engineer, have invented or discovered a new and useful invention of certain Improvements in the Construction of Wheels to be used upon Rail or other Roads or Ways; and I do hereby declare that the following is a full and exact description thereof.

These improvements in the construction of wheels to be used upon rails or other roads or ways consist in forming the tire of the wheel of cast or wrought iron having a channel or groove formed in it to be filled with blocks of wood with the grain of the wood placed vertically or endways all around in segments which are afterwards bolted or riveted or otherwise fastened in the channel of the tire and present a wooden faced rim or running surface to the road or way. The wood I prefer to be used for this purpose is African oak, British oak, beech or other hard wood previously soaked or saturated with coal gas tar and impregnated therewith by means of hydraulic or other pressure in order to fill up its pores and thus prevent the admission of moisture. Instead of the use of hard woods softer timber such as larch, &c., may be employed and previously squared or pressed into more perfect solidity, and I would remark also that the wood may be otherwise chemically prepared in order to prevent the admission of moisture or the pores may be filled by any oily substances being either pressed into the pores of the timber or introduced by vacuum or other means.

In order that the improvements may be perfectly understood I have hereto annexed a sheet of drawings representing my improved construction of wheel and have marked the same with figures and letters of reference corresponding with the following description thereof.

Figure 1:
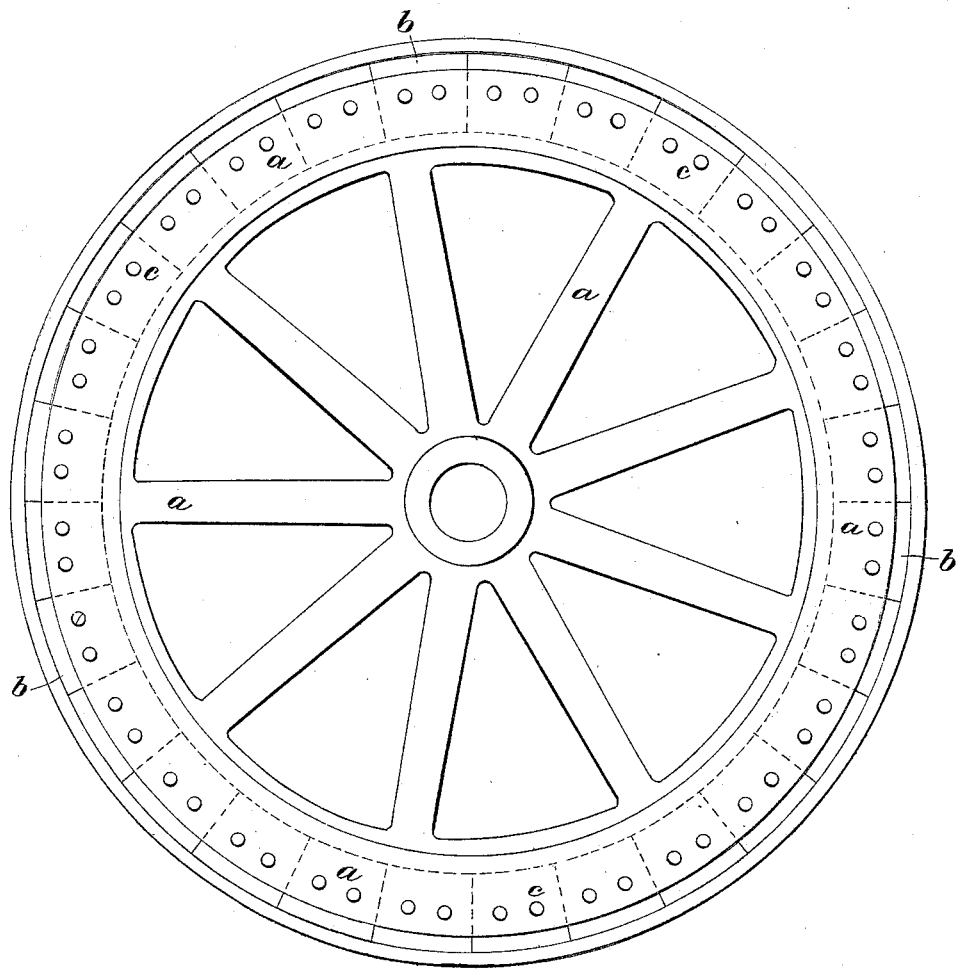
Figure 2:
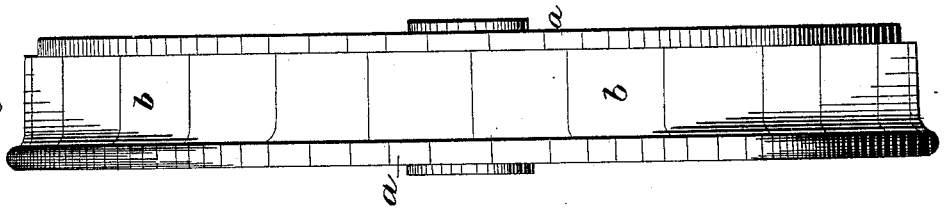
Figure 3:
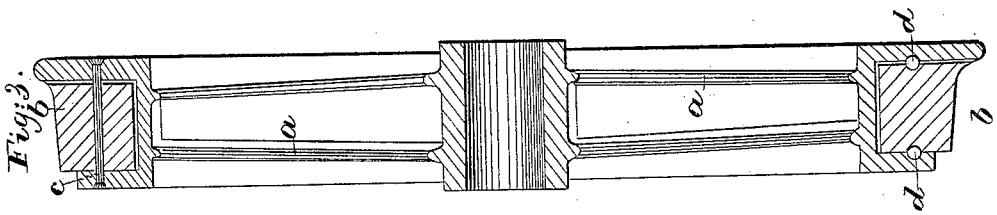
Figure 4:
Figure 5:
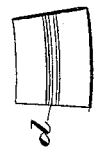

Figure 1, represent a front view of my improved wheel; Fig. 2, a side or edge view of the same, and Fig. 3, a section taken vertically through the middle of the wheel, $a$, $a$, $a$, $a$ represents the ordinary parts of a cast or wrought metal wheel having the rim or tire formed as a channel or groove in which are placed the several segments of wood, $b$, $b$, $b$, $b$ having the grain placed vertically and extending around the tire in order to form the running or outer periphery these segments of wood may be fastened into the metallic channels by various means by bolts or rivets as shown at $c$, $c$, $c$, $c$ or by turning a groove and running metal therein as shown at $d$, $d$ Figs. 4 and 5 represent detached segments and show either mode of fastening them to the metallic body of the wheel.

Having now fully explained the nature of the said invention I desire it to be understood that I claim—

The combination of a metallic wheel with a wooden faced tire or tread, as before explained without being confined to its precise mode of construction or putting together.

In witness whereof I the said HENRY DIRCKS have hereunto set my hand this sixth day of November one thousand eight hundred and forty.

HENRY DIRCKS.

Witnesses:
 GEO. LEWIS,
 JOHN DAVIS.